(12) United States Patent
Gong

(10) Patent No.: US 11,109,138 B2
(45) Date of Patent: Aug. 31, 2021

(54) DATA TRANSMISSION METHOD AND SYSTEM, AND BLUETOOTH HEADPHONE

(71) Applicant: GUANGDONG OPPO MOBILE TELECOMMUNICATIONS CORP., LTD., Guangdong (CN)

(72) Inventor: Jinhua Gong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/586,416

(22) Filed: Sep. 27, 2019

(65) Prior Publication Data

US 2020/0107107 A1 Apr. 2, 2020

(30) Foreign Application Priority Data

Sep. 30, 2018 (CN) .......................... 201811161290.2

(51) Int. Cl.
*H04R 1/10* (2006.01)
*H04W 4/80* (2018.01)
(Continued)

(52) U.S. Cl.
CPC ............ *H04R 1/1041* (2013.01); *H04W 4/80* (2018.02); *H04R 2420/07* (2013.01);
(Continued)

(58) Field of Classification Search
CPC ............ H04R 1/1041; H04R 2420/07; H04R 1/1016; H04R 2460/07; H04W 4/80;
(Continued)

(56) References Cited

U.S. PATENT DOCUMENTS

| 10,200,791 B1* | 2/2019 | Liu | .......................... H04W 4/80 |
| 2001/0018328 A1* | 8/2001 | Ohkura | .............. H04B 7/15542 |
| | | | 455/15 |

(Continued)

FOREIGN PATENT DOCUMENTS

| CN | 103391118 | 11/2013 |
| CN | 103391118 A | * 11/2013 |

(Continued)

OTHER PUBLICATIONS

EPO, Office Action for EP Application No. 19199565.3, dated Feb. 10, 2020.

(Continued)

*Primary Examiner* — Duc Nguyen
*Assistant Examiner* — Kuassi A Ganmavo
(74) *Attorney, Agent, or Firm* — Hodgson Russ LLP

(57) ABSTRACT

The embodiment of the disclosure discloses a data transmission method, device, and apparatus, and a Bluetooth headphone. The method is applied to a target Bluetooth headphone, the target Bluetooth headphone is applied to a data transmission system, the data transmission system comprises a mobile terminal and a plurality of Bluetooth headphones sequentially connected, there are more than one of the Bluetooth headphones connected with the mobile terminal in a first transmission direction. The method includes: acquiring sound signals and converting into first audio data; receiving second audio data transmitted from an adjacent Bluetooth headphone in the first transmission direction; and after mixing the first audio data and the second audio data that are simultaneously received, transmitting to an adjacent target device in a second transmission direction, wherein the target device is the Bluetooth headphone or the mobile terminal, and the second transmission direction is opposite to the first transmission direction.

20 Claims, 6 Drawing Sheets

(51) Int. Cl.
*H04W 76/10* (2018.01)
*H04W 52/02* (2009.01)
*H04W 76/23* (2018.01)
*H04W 36/30* (2009.01)

(52) U.S. Cl.
CPC ........ *H04W 36/30* (2013.01); *H04W 52/0274* (2013.01); *H04W 76/10* (2018.02); *H04W 76/23* (2018.02)

(58) Field of Classification Search
CPC . H04W 76/10; H04W 36/30; H04W 52/0274; H04W 52/0296; H04W 76/14; H04W 76/23; H04H 20/71
See application file for complete search history.

(56) References Cited

U.S. PATENT DOCUMENTS

| | | | |
|---|---|---|---|
| 2003/0100274 A1 | 5/2003 | Brown | |
| 2003/0176178 A1* | 9/2003 | Urata | H04M 1/72513 455/334 |
| 2006/0251277 A1* | 11/2006 | Cho | H04M 1/6066 381/311 |
| 2008/0152160 A1* | 6/2008 | Chew | H04H 20/61 381/71.6 |
| 2009/0017868 A1* | 1/2009 | Ueda | H04B 1/3877 455/557 |
| 2010/0035548 A1* | 2/2010 | Hunn | H04W 88/04 455/41.3 |
| 2010/0303244 A1 | 12/2010 | Kim et al. | |
| 2012/0189140 A1* | 7/2012 | Hughes | H04M 3/56 381/123 |
| 2015/0124976 A1* | 5/2015 | Pedersen | A61N 1/37252 381/23.1 |
| 2019/0044576 A1* | 2/2019 | Thoen | H04W 56/0015 |
| 2019/0268682 A1* | 8/2019 | Li | H04R 1/028 |
| 2019/0327778 A1* | 10/2019 | Morris | H04W 88/04 |
| 2019/0380018 A1* | 12/2019 | Tian | H04M 1/72505 |
| 2020/0359134 A1* | 11/2020 | Tong | H04L 1/1854 |

FOREIGN PATENT DOCUMENTS

| | | | |
|---|---|---|---|
| CN | 105208511 | | 12/2015 |
| CN | 106453790 | | 2/2017 |
| CN | 106453790 A | * | 2/2017 |
| CN | 106686541 | | 5/2017 |
| CN | 106936987 | | 7/2017 |
| CN | 108111953 A | * | 6/2018 |
| CN | 109246672 | | 1/2019 |
| GB | 2436188 | | 9/2007 |

OTHER PUBLICATIONS

SIPO, Second Office Action for CN Application No. 201811161290.2, dated Apr. 23, 2020.
SIPO, First Office Action for CN Application No. 201811161290.2, dated Nov. 21, 2019.
WIPO, English translation of the ISR and WO for PCT/CN2019/100251, Nov. 1, 2019.
SIPO, Third Office Action for CN Application No. 201811161290.2, dated Aug. 10, 2020.
SIPO, Decision of rejection for CN Application No. 201811161290.2, dated Dec. 3, 2020.
IPIN, Office Action for in Application No. 201914039328, dated Feb. 26, 2021.

* cited by examiner

DATA TRANSMISSION METHOD AND SYSTEM, AND BLUETOOTH HEADPHONE

CROSS-REFERENCE TO RELATED APPLICATION

This application claims priority to a Chinese Patent Application No. 201811161290.2, filed on Sep. 30, 2018, the entire disclosure of which is incorporated herein by reference.

TECHNICAL FIELD

The present disclosure relates to the field of Bluetooth apparatus technologies, and more particular, to a data transmission method, device and system, and a Bluetooth headphone.

BACKGROUND

With the development of mobile terminal technologies and wireless connection technologies, the technology of Bluetooth headphone is developed more maturely and is more widely used. A Bluetooth headphone is wirelessly connected to a mobile terminal through the Bluetooth technology, thereby capable of receiving audio data transmitted from the mobile terminal for audio playback. The data transmission between the headphone and the mobile terminal is no longer dependent on the wired connection, which greatly improves the convenience of the application. However, the data transmission mode between the Bluetooth headphone and the mobile terminal is relatively single and cannot satisfactorily meet the user's requirements.

BRIEF DESCRIPTION OF THE DRAWINGS

In order to more clearly illustrate the technical solutions in the embodiments of the present disclosure, the drawings used in the description of the embodiments are briefly described below. It is obvious that the drawings below are just some embodiments of the present disclosure, and other drawings can also be obtained from those skilled in the art based on these drawings without paying any creative effort.

DETAILED DESCRIPTION OF PREFERRED EMBODIMENTS

Figure 1:
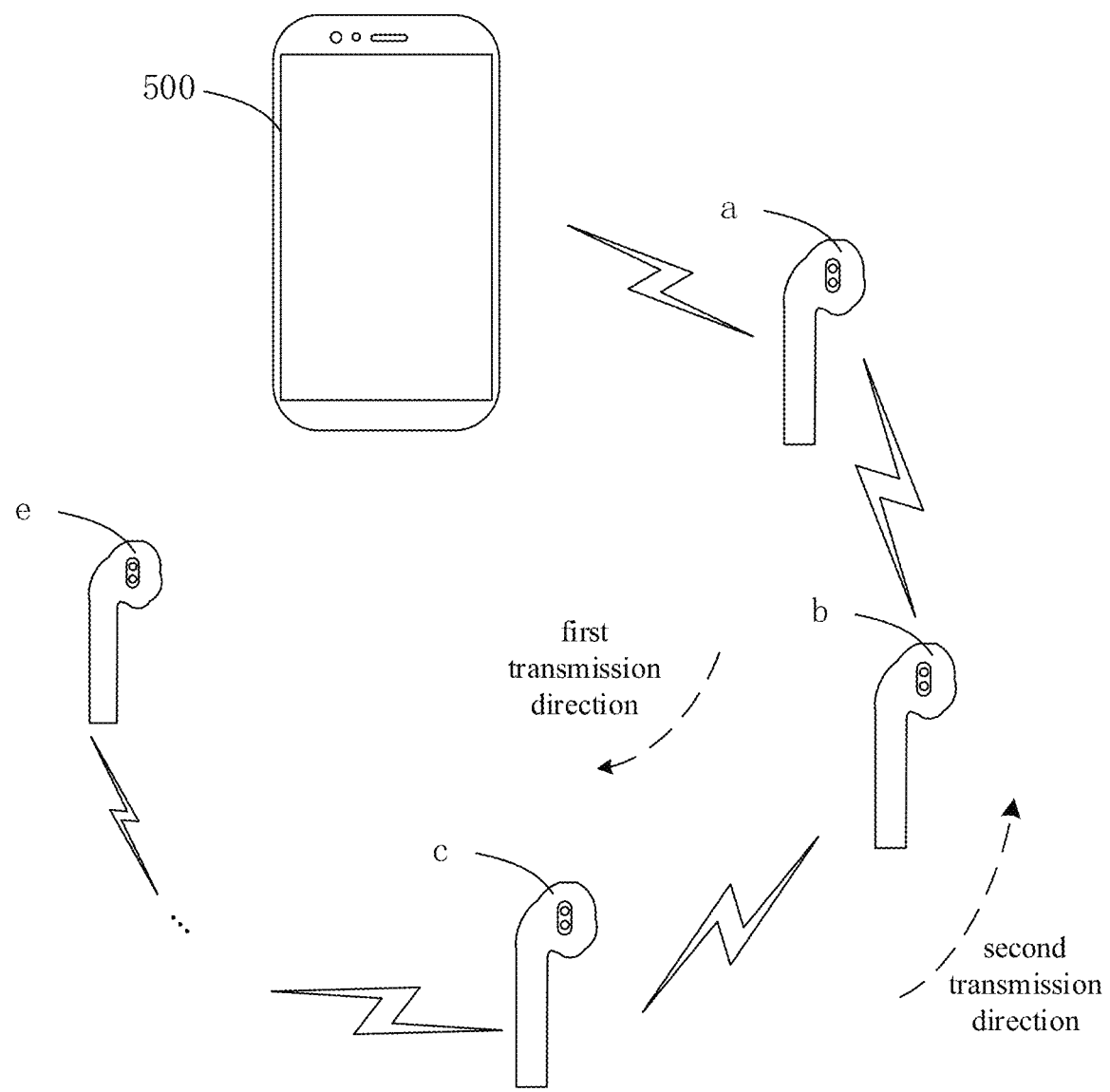
FIG. 1 illustrates a schematic diagram showing the connection in a data transmission system provided by an embodiment of the disclosure.

In order to enable those skilled in the art to understand the disclosure better, the technical solutions of the disclosure will be clearly and completely described in the following with reference to the accompanying drawings in the embodiments.

With the increase of types of audio playback devices and the improvement of playback effects, more users will choose to output the audio played by mobile terminals such as mobile phones and tablet computers to the audio playback device for playback. Common audio playback devices include car music players, loudspeakers, and headphones. The headphones include wired headphones and wireless headphones.

Take the headphone as an example, if the headphone is a wired headphone, the wired headphone is connected to the mobile terminal through a physical line, and the mobile terminal transmits audio to the wired headphone through the physical line, so that the wired headphone performs audio playback.

In order to liberate the use of the headphone from the wired situation, make the connection between the headphone and the mobile terminal not dependent on the physical line, and improve the convenience of the use thereof, the wireless headphone comes into being. The wireless headphone establishes a communication link according to a wireless communication protocol supported by the mobile terminal in advance, and then the mobile terminal transmits audio to the wireless headphone through the communication link, enabling the wireless headphone to perform audio playback. The wireless communication protocol may be a WLAN protocol, a Bluetooth protocol, or a ZigBee protocol. The disclosure is described by taking a wireless headphone connected by a Bluetooth protocol as an example.

In an embodiment of the disclosure, a headphone capable of establishing a Bluetooth connection with a device such as a mobile terminal and performing data transmission, via a Bluetooth protocol, a private protocol, or other commands, is defined as a Bluetooth headphone, such as a True Wireless Stereo (TWS) headphone, a TWS Plus. headphone, etc. Of course, the Bluetooth headphone can also be connected with other Bluetooth headphones over Bluetooth.

The mobile terminal can be connected with a Bluetooth headphone over Bluetooth, such as establishing an HFP connection. The mobile terminal can also be connected with a plurality of Bluetooth headphones. Each Bluetooth headphone can also be connected with one other Bluetooth headphone. The plurality of Bluetooth headphones can be referred to two or more Bluetooth headphones.

The mobile terminal and the Bluetooth headphones can constitute a data transmission system for performing data transmission. In the data transmission system, the mobile terminal and the plurality of Bluetooth headphones are connected in sequence. The specific number of the Bluetooth headphones in the data transmission system is not limited.

Specifically, the plurality of Bluetooth headphones are sequentially connected over Bluetooth, the mobile terminal is connected with one of the plurality of Bluetooth headphones, and the Bluetooth headphone connected with the mobile terminal is just connected with one of the Bluetooth headphones. The mobile terminal can send audio data to the Bluetooth-connected Bluetooth headphone, and can receive audio data transmitted from the Bluetooth headphone. The Bluetooth headphone can also send audio data to a Bluetooth-connected Bluetooth headphone and receive audio data from the Bluetooth-connected Bluetooth headphone. The Bluetooth headphone can also send audio data to a Bluetooth-connected mobile terminal and receive audio data transmitted form the Bluetooth-connected mobile terminal. The data transmission links between the mobile terminal and the Bluetooth headphone and between the Bluetooth headphones are determined according to their Bluetooth connection, for example, the Bluetooth headphone can transmit audio data to the mobile terminal through the HFP SCO link.

In some embodiments, the disclosure provides a data transmission method. The method is applied to a target Bluetooth headphone of a data transmission system, wherein the data transmission system comprises a mobile terminal and a plurality of Bluetooth headphones, the mobile terminal and the plurality of Bluetooth headphones are connected in sequence over Bluetooth, there are more than one of the plurality of the Bluetooth headphones connected with the mobile terminal in a first transmission direction, and the target Bluetooth headphone is one of the plurality of the Bluetooth headphones. The method comprises: acquiring sound signals and converting the sound signals into first audio data, through the target Bluetooth headphone; receiving second audio data transmitted from one of the plurality of Bluetooth headphones which is adjacent to the target Bluetooth headphone in the first transmission direction, through the target Bluetooth headphone; and after mixing the first audio data and the second audio data that are simultaneously received by the target Bluetooth headphone, transmitting the mixed audio data to an adjacent target device in a second transmission direction, wherein the target device is one of the plurality of Bluetooth headphones or the mobile terminal, and the second transmission direction is opposite to the first transmission direction.

In some embodiments, mixing the first audio data and the second audio data that are simultaneously received by the target Bluetooth headphone comprises: superimposing sampled values with the same sampling time in the first audio data and the second audio data that are simultaneously received to obtain the mixed audio data.

In some embodiments, the method further comprises: receiving third audio data transmitted from the adjacent target device in the second transmission direction, through the target Bluetooth headphone; playing the third audio data; and if there is one of the plurality of Bluetooth headphones adjacent to the target Bluetooth headphone in the first transmission direction, transmitting the third audio data to the Bluetooth headphone adjacent to the target Bluetooth headphone in the first transmission direction.

In some embodiments, prior to playing the third audio data, the method further comprises: determining, by the target Bluetooth headphone, whether the third audio data includes an identity; if yes, determining whether the included identity is the same as its own identity; if the same, performing the operation of playing the third audio data; if not the same, performing the operation of if there is one of the plurality of Bluetooth headphones adjacent to the target Bluetooth headphone in the first transmission direction, transmitting the third audio data to the Bluetooth headphone adjacent to the target Bluetooth headphone in the first transmission direction.

In some embodiments, in the data transmission system, the mobile terminal is connected with the plurality of Bluetooth headphones over Bluetooth, the adjacent target device in the second transmission direction of the target Bluetooth headphone is one of the plurality of the Bluetooth headphones, the method further comprises: receiving third audio data transmitted from the mobile terminal, via a Bluetooth connection between the target Bluetooth headphone and the mobile terminal.

In some embodiments, the method further comprises: if the first audio data and the second audio data are not simultaneously received by the target Bluetooth headphone, transmitting the first audio data and the second audio data to the adjacent target device in the second transmission direction respectively.

In some embodiments, the first received one of the first audio data and the second audio data is transmitted to the adjacent target device in the second transmission direction firstly.

In some embodiments, the method further comprises: if the first audio data and the second audio data arrive the target Bluetooth headphone at different times, the one firstly arrived is transmitted to the adjacent target device in the second transmission direction at first.

In some embodiments, the method further comprises: if the third audio data includes no identity, playing the third audio data through the target Bluetooth headphone, and performing the operation of if there is one of the plurality of Bluetooth headphones adjacent to the target Bluetooth headphone in the first transmission direction, transmitting the third audio data to the Bluetooth headphone adjacent to the target Bluetooth headphone in the first transmission direction.

In some embodiments, mixing the first audio data and the second audio data that are simultaneously received by the target Bluetooth headphone comprises: decoding the first audio data and the second audio data into data with a first audio format; mixing the decoded first audio data and the decoded second audio data to obtain the mixed audio data with the first audio format; and encoding the mixed audio data into data with a second audio format, wherein the second audio format is different form the first audio format.

In some embodiments, the disclosure provides a Bluetooth headphone, which comprises: a Bluetooth module, configured to connected with a mobile terminal or another Bluetooth headphone over Bluetooth; an audio acquiring unit, configured to acquire sound signals; an audio playing unit, configured to play corresponding audio data; a processor; a memory; and one or more program(s), wherein the one or more program(s) is(are) stored in the memory and configured to be executed by the processor, the one or more program(s) is(are) configured to perform the data transmission method described above.

In some embodiments, the disclosure provides a data transmission system. The system comprises a mobile terminal and a plurality of Bluetooth headphones, wherein the mobile terminal and the plurality of Bluetooth headphones are connected in sequence over Bluetooth, and there are more than one of the plurality of the Bluetooth headphones connected with the mobile terminal in a first transmission direction, wherein any one of the plurality of the Bluetooth headphones is configured to: acquire sound signals and convert the sound signals into first audio data, receive second audio data transmitted from one of the plurality of Bluetooth headphones which is adjacent to the target Bluetooth headphone in the first transmission direction, and after mixing the first audio data and the second audio data that are simultaneously received, transmit the mixed audio data to an adjacent target device in a second transmission direction, wherein the target device is one of the plurality of Bluetooth headphones or the mobile terminal, and the second transmission direction is opposite to the first transmission direction. Wherein the mobile terminal is configured to receive audio data from one of the plurality of the Bluetooth headphones which is adjacent to the mobile terminal.

In some embodiments, the mobile terminal is further configured to transmit third audio data to one of the plurality of the Bluetooth headphones which is adjacent to the mobile terminal; wherein any one of the plurality of the Bluetooth headphones is further configured to: receive third audio data transmitted from the adjacent target device in the second transmission direction, play the third audio data, and if there is one of the plurality of Bluetooth headphones adjacent to this Bluetooth headphone in the first transmission direction, transmit the third audio data to the Bluetooth headphone adjacent to this Bluetooth headphone in the first transmission direction.

In some embodiments, the system further comprises another mobile terminal, wherein the mobile terminal and the another mobile terminal are connected over network, wherein the mobile terminal is further configured to receive third audio data from the another mobile terminal, wherein the mobile terminal is further configured to transmit audio data received form one of the plurality of Bluetooth headphones which is adjacent to itself to the another mobile terminal.

In some embodiments, any one of the plurality of the Bluetooth headphones is further configured to determine whether the third audio data includes an identity; if yes, any one of the plurality of the Bluetooth headphones is further configured to determine whether the included identity is the same as its own identity; if no, any one of the plurality of the Bluetooth headphones plays the third audio data and performs the operation of if there is one of the plurality of Bluetooth headphones adjacent to this Bluetooth headphone in the first transmission direction, transmitting the third audio data to the Bluetooth headphone adjacent to this Bluetooth headphone in the first transmission direction.

In some embodiments, if the included identity is the same as its own identity, any one of the plurality of the Bluetooth headphones plays the third audio data; if not the same, any one of the plurality of the Bluetooth headphones performs the operation of if there is one of the plurality of Bluetooth headphones adjacent to this Bluetooth headphone in the first transmission direction, transmitting the third audio data to the Bluetooth headphone adjacent to this Bluetooth headphone in the first transmission direction.

In some embodiments, the mobile terminal comprises a plurality of first Bluetooth modules, and the plurality of first Bluetooth modules are connected with the plurality of the Bluetooth headphones respectively.

In some embodiments, any one of the plurality of the Bluetooth headphones comprises: a Bluetooth module, configured to connect with a mobile terminal or another Bluetooth headphone over Bluetooth; an audio acquiring unit, configured to acquire sound signals; an audio playing unit, configured to play corresponding audio data; a processor; and a memory with programs stored therein.

In some embodiments, any one of the plurality of the Bluetooth headphones comprises more than one second Bluetooth modules, and the second Bluetooth modules are connected with different devices respectively.

In some embodiments, wherein the mobile terminal is connected with each of the plurality of Bluetooth headphones over Bluetooth.

FIG. 1 is a schematic diagram showing the connection of a data transmission system provided by an embodiment of the present application. Bluetooth headphone a, Bluetooth headphone b, Bluetooth headphone c until Bluetooth headphone e in sequence, Bluetooth connection, mobile terminal and Bluetooth headphone a Bluetooth connection.

In the embodiment of the present application, the direction in which the mobile terminal connects to the Bluetooth headphone is defined as the first transmission direction. That is to say, the direction in which the mobile terminal transmits audio data to the Bluetooth-connected Bluetooth headphone is the first transmission direction. In the first transmission direction, the audio data is transmitted from a Bluetooth headphone that is close to the mobile terminal to a Bluetooth headphone that is far from the mobile terminal. Among them, the closer the Bluetooth headphone is to the mobile terminal, the fewer Bluetooth headphones are separated from the mobile terminal. In the embodiment of the present application, the direction opposite to the first transmission direction is defined as the second transmission direction, and in the second transmission direction, the audio data is transmitted from the Bluetooth headphone to the mobile terminal.

FIG. 1 illustrates a schematic diagram showing the connection in a data transmission system provided by an embodiment of the disclosure. A Bluetooth headphone a, a Bluetooth headphone b, a Bluetooth headphone c, until a Bluetooth headphone e are connected over Bluetooth in sequence, and the mobile terminal 500 is connected with the Bluetooth headphone a over Bluetooth.

In the embodiment of the disclosure, the direction in which the mobile terminal connects to the Bluetooth headphone is defined as a first transmission direction. That is, the direction in which the mobile terminal transmits audio data to the Bluetooth-connected Bluetooth headphone is the first transmission direction. In the first transmission direction, audio data is transmitted from the Bluetooth headphone that is close to the mobile terminal to the Bluetooth headphone that is far from the mobile terminal. The closer the Bluetooth headphone is to the mobile terminal, the fewer Bluetooth headphones are disposed therebetween. In the embodiment of the disclosure, the direction opposite to the first transmission direction is defined as a second transmission direction, and in the second transmission direction, audio data is transmitted from the Bluetooth headphone to the mobile terminal.

As shown in FIG. 1, the direction in which data is transmitted from the mobile terminal 500 to the Bluetooth headphone a, from the Bluetooth headphone a to the Bluetooth headphone b, from the Bluetooth headphone b to the Bluetooth headphone c, from the Bluetooth headphone c to the next Bluetooth headphone until the Bluetooth headphone e, is the first transmission direction. The second transmission direction is opposite to the first transmission direction. That is, the direction that data transmitted from the Bluetooth headphone e to an adjacent Bluetooth headphone thereof is the second transmission direction, the direction that data transmitted from the Bluetooth headphone c to the Bluetooth headphone b is the second transmission direction, the direction that data transmitted from the Bluetooth headphone b to the Bluetooth headphone a is the second transmission direction, and the direction that data transmitted from the Bluetooth headphone a to the mobile terminal is the second transmission direction, here are not all examples enumerated one by one.

In the embodiment of the disclosure, a particular Bluetooth headphone can determine whether another Bluetooth headphone transmitting audio data to it is in the first transmission direction or the second transmission direction, depending on the number of the Bluetooth headphones between the particular Bluetooth headphone and the mobile terminal. Specifically, in the data transmission system, when the mobile terminal and every Bluetooth headphone establish Bluetooth connections, every Bluetooth headphone can record the number of Bluetooth headphones in the transmission path between the mobile terminal and itself. The Bluetooth headphone can send its own recorded number of Bluetooth headphones at the same time when sending audio data to adjacent devices. Taking any Bluetooth headphone as a target Bluetooth headphone, when the target Bluetooth headphone receives audio data, the number of headphones recorded in the Bluetooth headphone which sending the audio data is the first number, and the number of headphones recorded by itself is the second number, the first number and the second number is judged which is greater. If the first number is greater than the second number, it is indicated that the Bluetooth headphone sending the audio data is further away from the mobile terminal, in the first transmission direction of the target Bluetooth headphone; if the first number is less than the second number, it is indicated that the Bluetooth headphone sending the audio data is closer to the mobile terminal, in the second transmission direction of the target Bluetooth.

In one embodiment, the Bluetooth headphone records the number of Bluetooth headphones in the transmission path between the mobile terminal and itself maybe in such a manner that, the Bluetooth headphone connected with the mobile terminal may send its address to another connected Bluetooth headphone when connecting, the Bluetooth headphone receiving the address saves the address. When the Bluetooth headphone is connected to a next Bluetooth headphone, it will send its own address and the saved address to the next Bluetooth headphone. And so on, each Bluetooth headphone can save the address of every Bluetooth headphone between the mobile terminal and itself. According to the number of saved Bluetooth headphone addresses, the number of Bluetooth headphones between the mobile terminal and itself can be known. It can be understood that, identity information is exchanged between the interconnected mobile terminal and the Bluetooth headphone, and between the connected Bluetooth headphones, so each Bluetooth headphone can find the one connected therewith is a Bluetooth headphone or a mobile terminal.

In another embodiment, the manner in which the Bluetooth headphone records the number of Bluetooth headphones in the transmission path between the mobile terminal and itself may also be: each Bluetooth headphone defines a parameter for recording the number of Bluetooth headphones between the mobile terminal and itself, and the parameter value may be initialized to 0. The Bluetooth headphone connected with the mobile terminal keeps the parameter value at 0, and the Bluetooth headphone connected with the mobile terminal transmits its own parameter value to another connected Bluetooth headphone when connecting the another Bluetooth headphone. The Bluetooth headphone that receives the parameter value adds 1 to its own parameter value, and so on. Thus, the parameter value of each Bluetooth headphone is incremented by one based on the parameter value of the adjacent Bluetooth headphone that is closer to the mobile terminal. And, each Bluetooth headphone can obtain the number of Bluetooth headphones between the mobile terminal and itself through the parameter value.

In the embodiment of the disclosure, the Bluetooth headphone can also record the Bluetooth headphone connected thereto is in the first transmission direction or the second transmission direction when connecting. For example, the Bluetooth headphone connected with the mobile terminal defines a direction parameter, when the Bluetooth headphones are connected with each other, the Bluetooth headphone with the direction parameter is recorded as the Bluetooth headphone in its second transmission direction, and the Bluetooth headphone without the direction parameter is recorded as the Bluetooth headphone in its first transmission direction. Taking FIG. 1 as an example, the Bluetooth headphone a is connected with the mobile terminal, and defines the direction parameter. Bluetooth headphone b is connected with the Bluetooth headphone a and has no direction parameter, so the Bluetooth headphone a records Bluetooth headphone b as the Bluetooth headphone in its first transmission direction; Bluetooth headphone a has the direction parameter, Bluetooth headphone b records the Bluetooth headphone a as the Bluetooth headphone in its second transmission direction, and the Bluetooth headphone b defines a direction parameter for itself. Bluetooth headphone c is connected with the Bluetooth headphone b and has no direction parameter, the Bluetooth headphone b records the Bluetooth headphone c as the Bluetooth headphone in its first transmission direction; the Bluetooth headphone b has the direction parameter, the Bluetooth headphone c records the Bluetooth headphone b as the Bluetooth headphone in its second transmission direction, and the Bluetooth headphone c defines a direction parameter for itself. And so on.

In the embodiment of the disclosure, the Bluetooth headphone can be connected with other Bluetooth headphones through a Bluetooth module, and connected with the mobile terminal via the Bluetooth module. If there is more than one device connected with the Bluetooth headphone, it can connect different devices through different Bluetooth modules. For example, the Bluetooth headphone is connected with two other Bluetooth headphones, two Bluetooth modules thereof are connected with Bluetooth modules of the other two Bluetooth headphones, respectively.

If the mobile terminal just transmits audio data to the Bluetooth headphone and the audio data is played through the Bluetooth headphone, the data transmission manner is single. In the embodiment of the disclosure, the audio data transmitted from the mobile terminal may be transmitted to the sequentially connected Bluetooth headphones in the first transmission direction, and any one of the sequentially connected Bluetooth headphones may receive the sound signals and convert into audio data, and then the audio data is transmitted to the mobile terminal in the second transmission direction, so that the data transmission manner in the data transmission system is more various.

The embodiment of the disclosure provides a data transmission method in which audio data transmission is performed. The data transmission method and device, the mobile terminal 500, and a storage medium provided by the disclosure will be described in detail below through specific embodiments.

Figure 2:
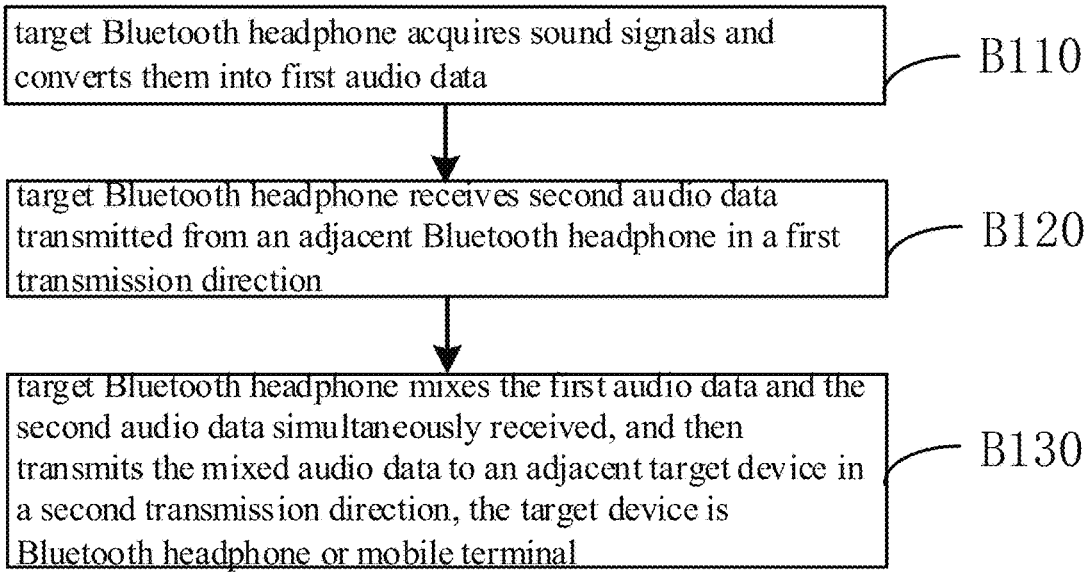
FIG. 2 illustrates a flowchart of a data transmission method provided by an embodiment of the disclosure.

Referring to FIG. 2, an embodiment of the disclosure provides a data transmission method, which is applied to a Bluetooth headphone in a data transmission system. In this embodiment, a Bluetooth headphone in the data transmission system is taken as an example. The Bluetooth headphone can be any Bluetooth headphone of the data transmission system, and the Bluetooth headphone is defined as a target Bluetooth headphone. As shown in FIG. 2, the method includes:

Block B110: the target Bluetooth headphone acquires sound signals and converts them into first audio data.

The target Bluetooth headphone can be provided with an audio acquiring unit such as a microphone. The user of the target Bluetooth headphone can make voice input through the microphone. For example, when the user wearing the target Bluetooth headphone speaks, the microphone can receive sound signals generated by the user's speaking. The target Bluetooth headphone can convert the sound signals into audio data. In the embodiment of the disclosure, the audio data converted by the target Bluetooth headphone from the sound signals is defined as the first audio data.

The implementation method of acquiring sound signals and converting them into audio data by the target Bluetooth headphone is not limited in the embodiment of the disclosure. For example, it may be that the user inputs voice through a microphone of the target Bluetooth headphone, the voice passes through the microphone and is converted into a series of voltage-varying signals, and then the signals are sampled and converted into digital audio data.

Block B120: the target Bluetooth headphone receives second audio data transmitted from one of the plurality of Bluetooth headphones which is adjacent to the target Bluetooth headphone in a first transmission direction.

Bluetooth headphones each can also receive audio data from other Bluetooth headphones. For example, when another Bluetooth headphone receives voice information input by the user and converts it into audio data, it needs to send the audio data to the mobile terminal. The target Bluetooth headphone locates at the transmission path that the another Bluetooth headphone transmits audio data to the mobile terminal. The target Bluetooth headphone receives the audio data transmitted from the another Bluetooth headphone through Bluetooth.

In the data transmission system provided in the embodiment of the disclosure, the Bluetooth headphones are connected with each other by Bluetooth in sequence, and the target Bluetooth headphone can receive audio data from adjacent Bluetooth headphones. Audio data received by the target Bluetooth headphone from the adjacent Bluetooth headphone in the first transmission direction is defines as second audio data, that is, the target Bluetooth headphone receives the audio data transmitted by other Bluetooth headphones converted form sound signals as the second audio data. The Bluetooth headphone adjacent to the target Bluetooth headphone in the first transmission direction is the Bluetooth headphone connected with the target Bluetooth headphone in the first transmission direction. For example, in FIG. 1, the Bluetooth headphone b is the adjacent Bluetooth headphone of the Bluetooth head set a in the first transmission direction; the Bluetooth headphone c is the adjacent Bluetooth headphone of the Bluetooth headphone b in the first transmission direction.

It can be understood that, in the embodiment of the disclosure, the sequence that the target Bluetooth headphone receives the second audio data and the voice input from the user is not limited. That is, the sequence of the blocks B110 and B120 is not limited, the block B110 may be performed first, or the block B120 may be performed first, or the blocks B110 and B120 may be performed simultaneously, which may be determined according to the time that the Bluetooth headphone actually receives the data.

Block B130: the target Bluetooth headphone mixes the first audio data and the second audio data simultaneously received, and then transmits the mixed audio data to an adjacent target device in the second transmission direction, wherein the target device is one of the plurality of Bluetooth headphones or the mobile terminal.

The target Bluetooth headphone receives the first audio data and the second audio data at the same time, if the first audio data and the second audio data are transmitted respectively, it is needed to occupy more bandwidth, affects the transmission speed, and causes some audio data may be delayed. Therefore, the first audio data and the second audio data can be mixed and then transmitted to the adjacent target device in the second transmission direction.

The specific manner in which the target Bluetooth headphone mixes the first audio data and the second audio data is not limited. For example, when the first audio data is sampled, a sampling time is stored corresponding to each sample value. Similarly, each sample value in the second audio data corresponds to a sampling time. Since the superposition of the quantized voice signals is equivalent to the superposition of the acoustic waves in the air, the target Bluetooth headphone simultaneously superimposes the sampled values of the same sampling time, in the first audio data and the second audio data received simultaneously, to obtain the mixed audio data.

It can be understood that since the audio data involves processing such as encoding and decoding during the Bluetooth transmission, before mixing the first audio data and the second audio data, they are decoded into an audio format that is suitable for mixing, such as original PCM audio data.

For example, audio data needs to be encoded in a format supported by the Bluetooth protocol for transmission via Bluetooth. Therefore, after acquiring PCM audio data, the Bluetooth headphone encodes the PCM audio data into audio data that can be transmitted via Bluetooth, for example, audio data with encoding formats such as Advanced Audio Coding (AAC), Sub-Band Coding (SBC), and the like. After the target Bluetooth headphone receives the second audio data with AAC, SBC, and the like encoding format through the Bluetooth connection, it decodes the second audio data into PCM audio data. The decoded second audio data is then mixed with the first audio data that is PCM data. The mixed audio data is PCM audio data, and the mixed PCM audio data is encoded into audio data with an audio encoding format supported by the Bluetooth protocol such as AAC or SBC. The encoded audio data is transmitted to the adjacent target device in the second transmission direction.

It should be noted that, when the first audio data and the second audio data are received by the target Bluetooth headphone not simultaneously, in other words, when the first audio data and the second audio data arrive the target Bluetooth headphone at different times, the first audio data and the second audio data are transmitted respectively, the one firstly arrived will be transmitted at first. If the target Bluetooth headphone just receives the first audio data, the first audio data is transmitted to the adjacent target device in the second transmission direction.

If the target Bluetooth headphone just receives the second audio data, the second audio data is transmitted to the adjacent target device in the second transmission direction.

The adjacent target device of the target Bluetooth headphone in the second transmission direction is, the device connected with the target Bluetooth headphone in the second transmission direction. For example, in FIG. 1, the mobile terminal is the adjacent device of the Bluetooth headphone a in the second transmission direction; the Bluetooth headphone a is the adjacent device of the Bluetooth headphone b in the second transmission direction; the Bluetooth headphone b is the adjacent device of the Bluetooth headphone c in the second transmission direction. In the data transmission system, the adjacent device of the target Bluetooth headphone in the second transmission direction may be a mobile terminal, when the Bluetooth headphone a in FIG. 1 is the target Bluetooth headphone; the adjacent device of the target Bluetooth headphone in the second transmission direction also may be a Bluetooth headphone, when any other Bluetooth headphones except the Bluetooth headphone a in FIG. 1 is the target Bluetooth headphone.

If the target device is one of the plurality of Bluetooth headphones, after the target device receives the audio data, the audio data may be transmitted to a next Bluetooth-connected device in the second transmission direction until being transmitted to the mobile terminal.

If the target device is the mobile terminal, the audio data of the target Bluetooth headphone is successfully transmitted to the mobile terminal.

Figure 3:
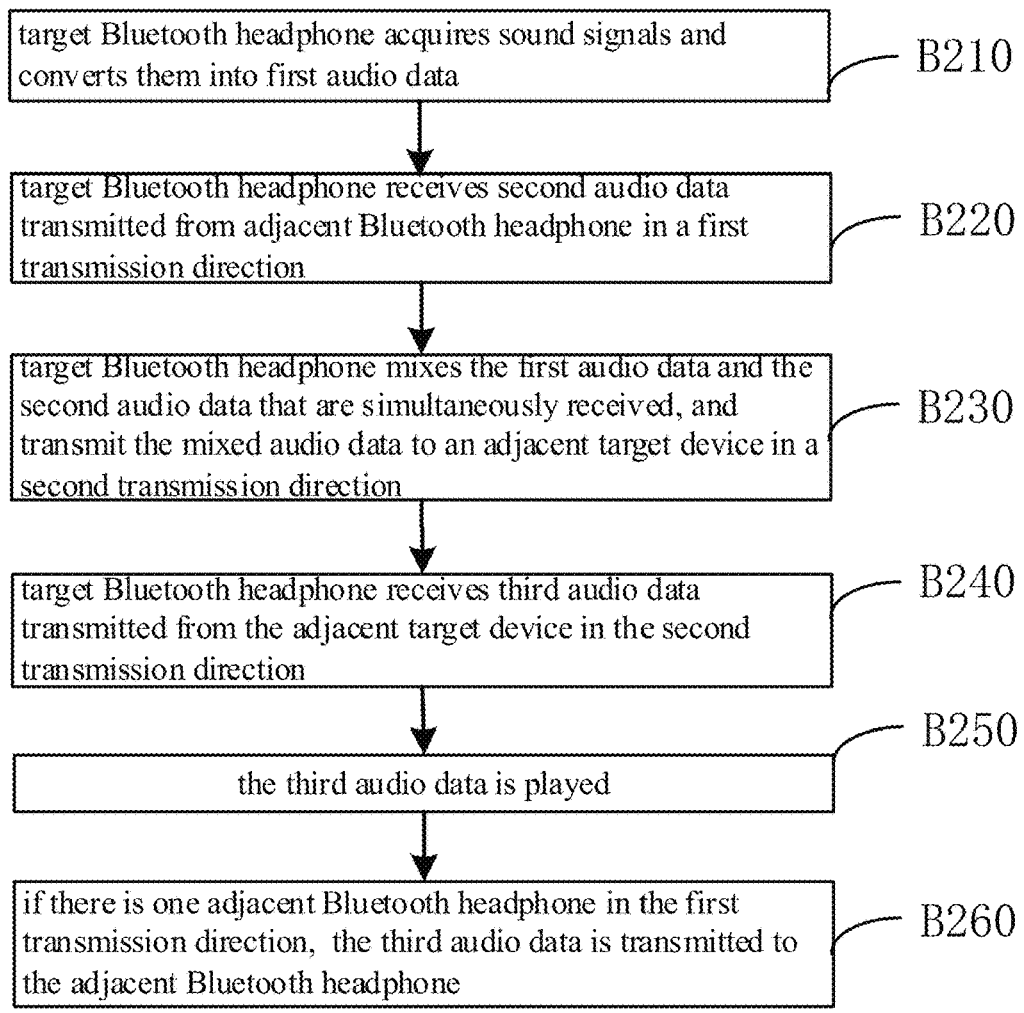
FIG. 3 illustrates a flowchart of a data transmission method provided by another embodiment of the disclosure.

In the embodiment of the disclosure, any one of the Bluetooth headphones can receive the voice input of the user, convert the voice input into the first audio data. Any one of the Bluetooth headphones can also receive the second audio data transmitted form the adjacent Bluetooth headphone in the first transmission direction. The Bluetooth headphone can mix the first audio data and the second audio data received simultaneously, and then transmit the mixed data to the adjacent target device in the second transmission direction. If the adjacent target device is one of the Bluetooth headphones, the Bluetooth headphone uses the received audio data as the second audio data, and if the Bluetooth headphone has the first audio data corresponding to the user voice input, the first audio data and the second audio data can be mixed and transmitted to a next target device in the second transmission direction, until the audio data corresponding to the voice input received by each Bluetooth headphone is transmitted to the mobile terminal, so that the transmission of the audio data in the second transmission direction is achieved The data transmission method provided by the disclosure further includes that the mobile terminal transmits audio data to each Bluetooth headphone in the data transmission system. Specifically, referring to FIG. 3, the data transmission method may include:

Block B210: the target Bluetooth headphone acquires sound signals and converts them into first audio data.

Block B220: the target Bluetooth headphone receives second audio data transmitted from one of the plurality of Bluetooth headphones which is adjacent to the target Bluetooth headphone in a first transmission direction.

Block B230: after the target Bluetooth headphone mixing the first audio data and the second audio data that are simultaneously received, the mixed audio data is transmitted to an adjacent target device in the second transmission direction.

Block B240: the target Bluetooth headphone receives third audio data transmitted from the adjacent target device in the second transmission direction.

The target Bluetooth headphone can receive audio data transmitted from the adjacent headphone in the first transmission direction, that is, the audio data can be transmitted in the second transmission direction and transmitted from any Bluetooth headphone to the mobile terminal.

In addition, the audio data also can be transmitted in the first transmission direction, that is, the audio data is transmitted from the mobile terminal to the Bluetooth headphone. Specifically, when the mobile terminal sends audio data to the Bluetooth headphones, it is firstly sent to the Bluetooth headphone adjacent thereto, and the Bluetooth headphone is sent to a next Bluetooth headphone in the first transmission direction until it is sent to the last Bluetooth headphone.

Therefore, the target Bluetooth headphone can receive the audio data transmitted from the adjacent target device in the second transmission direction, and define the audio data as the third audio data.

The adjacent target device of the target Bluetooth headphone in the second transmission direction may be one of the Bluetooth headphones, when the Bluetooth headphone b to the Bluetooth headphone e of FIG. 1 is the target Bluetooth headphone.

The adjacent target device of the target Bluetooth headphone in the second transmission direction may also be a mobile terminal, when the Bluetooth headphone a of FIG. 1 is the target Bluetooth headphone.

Block B250: the third audio data is played.

Block B260: if there is one of the plurality of Bluetooth headphones adjacent to the target Bluetooth headphone in the first transmission direction, the target Bluetooth headphone transmits the third audio data to the Bluetooth headphones adjacent to the target Bluetooth headphone in the first transmission direction.

The target Bluetooth headphone plays the received third audio data. If the target Bluetooth headphone has the adjacent Bluetooth headphone in the first transmission direction, such as the other Bluetooth headphones except the Bluetooth headphone e in FIG. 1, the third audio data is continuously transmitted in the first transmission direction and sent to the adjacent Bluetooth headphone in the transmission direction thereof. Thus, the audio data transmitted from the mobile terminal can be sequentially transmitted to every Bluetooth headphone.

In the embodiment of the disclosure, the sequence of the blocks B250 and S260 is not limited. The block B250 may be performed first, or the block B260 may be performed first, or the blocks B250 and B260 may be performed simultaneously.

In addition, in the embodiment of the disclosure, the sequence that the target Bluetooth headphone receives the third audio data, the second audio data, and the first audio data is not limited, and the sequence is determined according to the order of arrival of the data in the actual use process. If the first audio data is received, the first audio data is transmitted in the second transmission direction; if the second audio data is received, the second audio data is transmitted in the second transmission direction; if the third audio is received, the third audio data is transmitted in the first transmission direction.

In some embodiments, in the embodiment of the disclosure, the mobile terminal may transmit the audio data to a designated Bluetooth headphone, so that when the multiple Bluetooth headphones in the data transmission system are worn by different users, the mobile terminal may just transmit voice information to the user corresponding to the designated Bluetooth headphone. Specifically, the audio data transmitted to the Bluetooth headphone can carry an identity identifier of the Bluetooth headphone, and the Bluetooth headphone corresponding to the identity identifier play the audio data transmitted form the mobile terminal.

Figure 4:
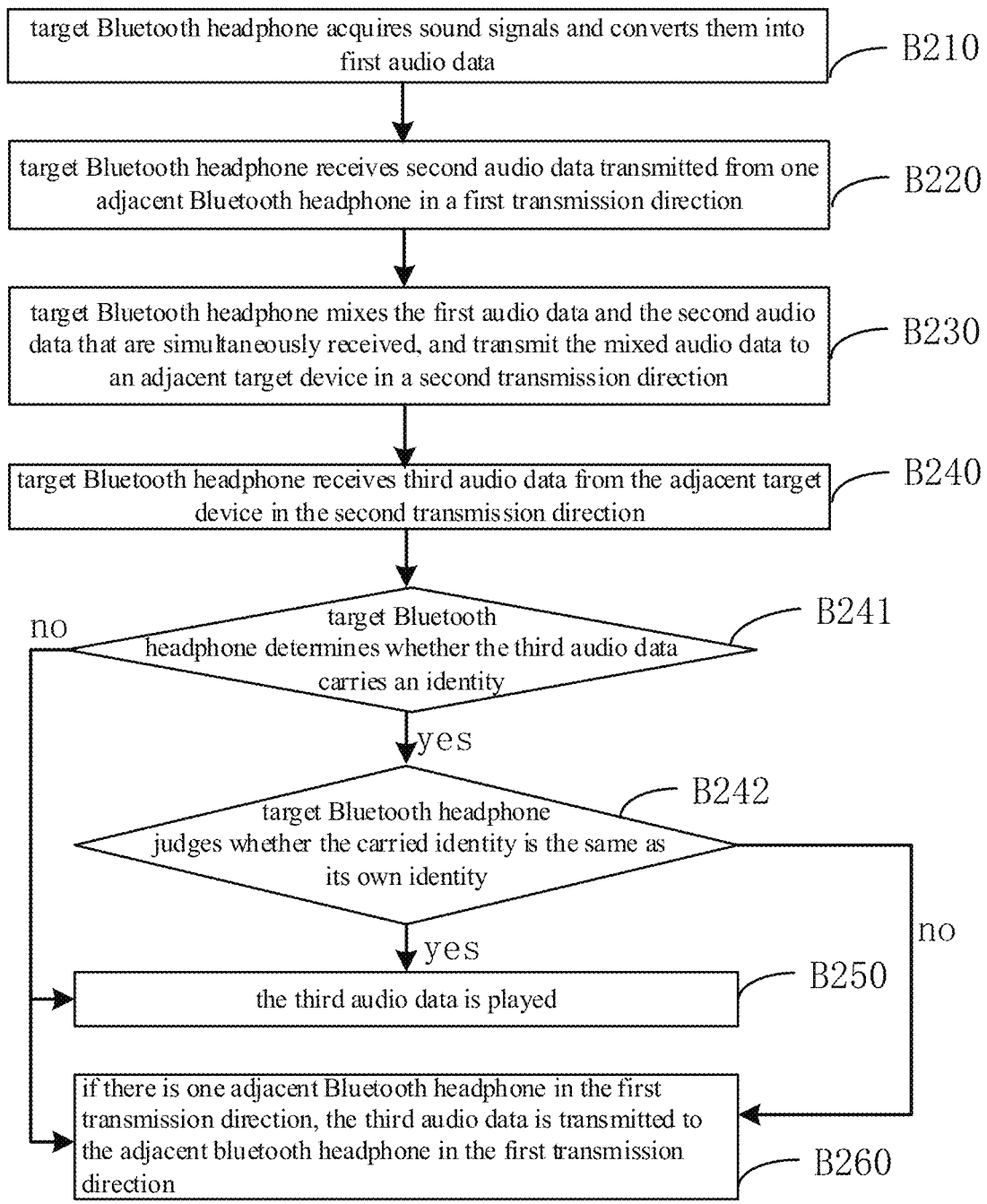
FIG. 4 illustrates another flow chart of the data transmission method provided by another embodiment of the disclosure.

Therefore, in some embodiments, as shown in FIG. 4, prior to the block B250 of the embodiment of the disclosure, it may also include:

Block B241: the target Bluetooth headphone determines whether the third audio data carries an identity. If yes, the block B242 is executed; if not, the blocks B250 and B260 are executed.

When the target Bluetooth headphone receives the third audio data, the target Bluetooth headphone checks whether there is an identity carried in the third audio data at first.

For example, in the third audio data, the identity of the Bluetooth headphone can be stored in a particular field. When the target Bluetooth headphone receives the third audio data, check whether the field has an identity or not. If the field is empty, or the field has data representing without identity, it is determined that the third audio data does not carry the identity of Bluetooth headphone; if the field is not empty, or the field is data representing the identity, it is determined that the third audio data carries the identity.

Block B242: the carried identity is judged whether the same as its own identity. If they are the same, block B250 is executed; if they are not the same, block B260 is executed.

If the third audio data received by the target Bluetooth headphone carries the identity, it is determined whether the identity is the same as its own identity or not.

If they are the same, the third audio data is played and is not transmitted to other Bluetooth headphones in the first transmission direction.

If not, the third audio data is transmitted to other Bluetooth headphones. If there is one of the plurality of Bluetooth headphones adjacent to the target Bluetooth headphone in the first transmission direction, the third audio data is transmitted to the adjacent Bluetooth headphones of the target Bluetooth headphone in the first transmission direction.

If there is no adjacent Bluetooth headphone in the first transmission direction, that is, the target Bluetooth headphone is the last Bluetooth headphone in the first transmission direction, when the identity carried in the third audio data is different from its own identity, the third audio data can be discarded in such case.

If the third audio data received by the target Bluetooth headphone does not carry the identity, the third audio data is played and transmitted to an adjacent Bluetooth headphone in the first transmission direction, if there is the adjacent Bluetooth headphone in the first transmission direction.

In the embodiment of the disclosure, the audio data may be transmitted to the mobile terminal in the second transmission direction after being acquired by the Bluetooth headphones, or may be transmitted from the mobile terminal to the Bluetooth headphones in the first transmission direction, so that the data transmission in the data transmission system is more various in forms and meets various transmission requirements of the users.

Figure 5:
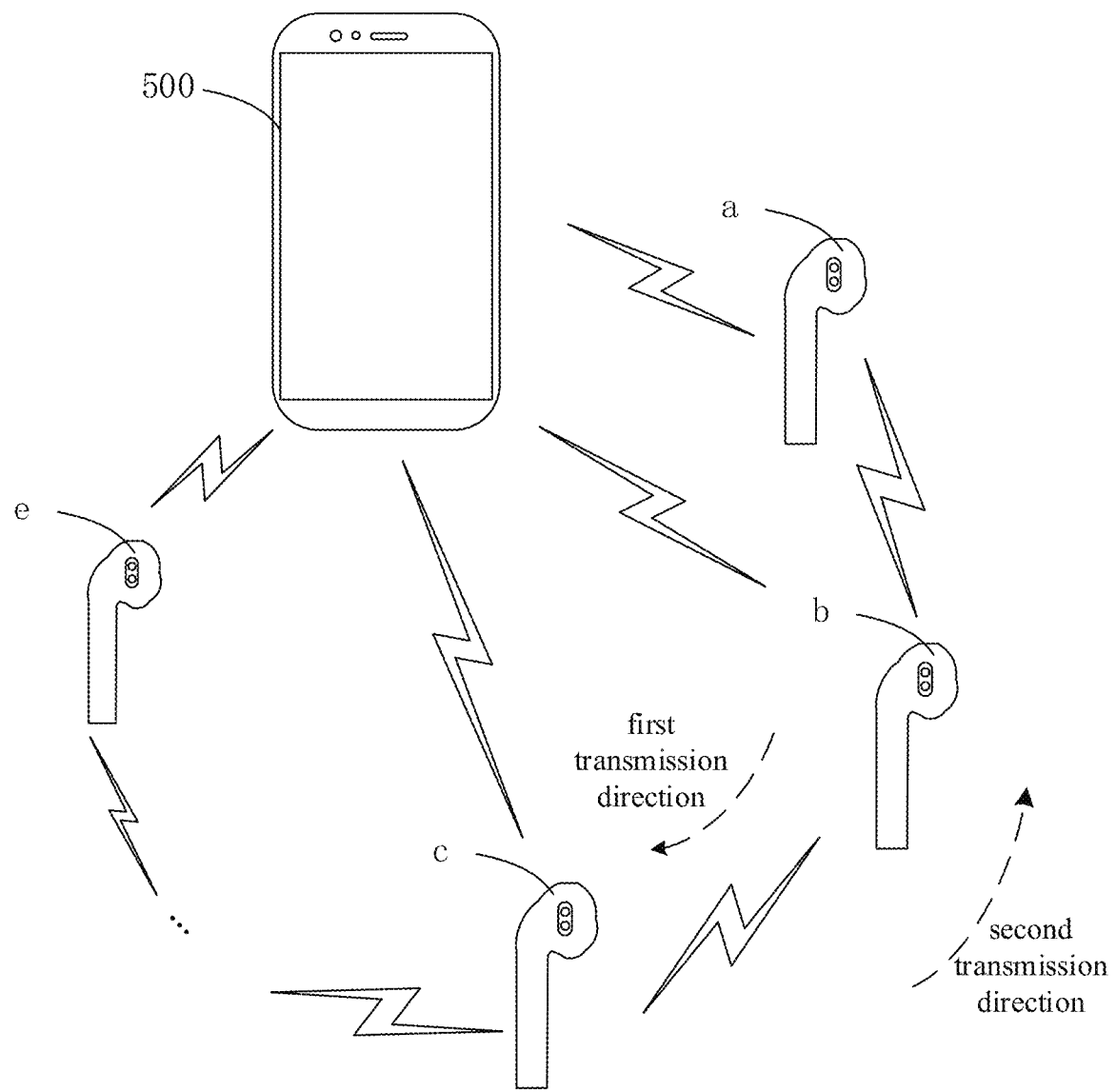
FIG. 5 illustrates another schematic diagram showing the connection of the data transmission system provided by an embodiment of the disclosure.
Figure 6:
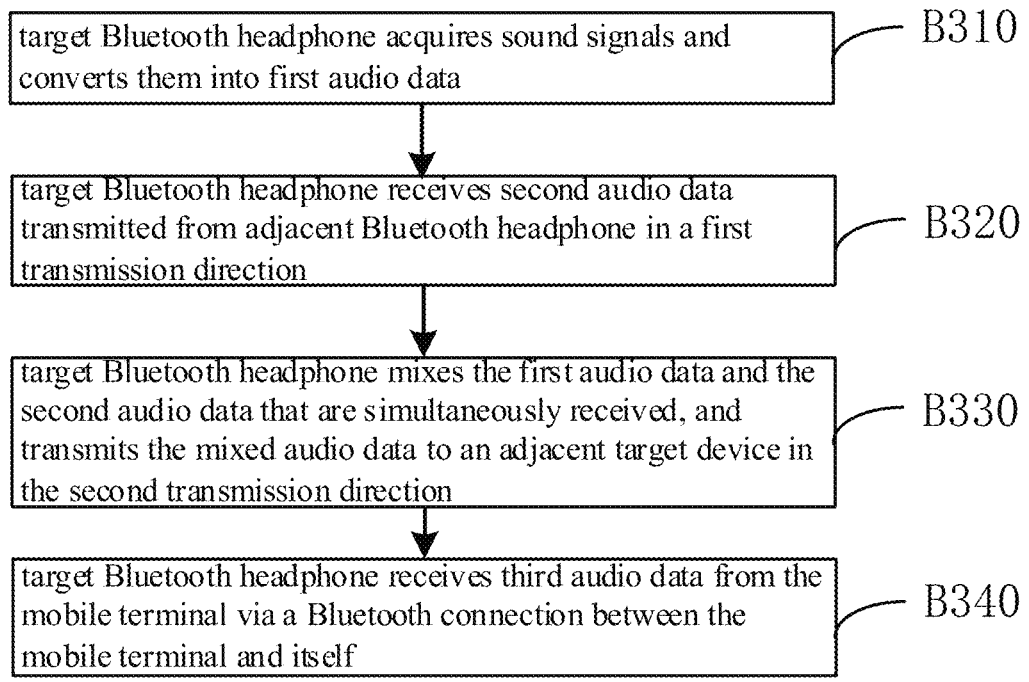
FIG. 6 illustrates a flowchart of a data transmission method provided by still another embodiment of the disclosure.

In the embodiment of the disclosure, in order to increase the speed at which the mobile terminal transmits audio data to each Bluetooth headphone and to reduce the pressure of data processing of each Bluetooth headphone, the mobile terminal may be connected with the plurality of Bluetooth headphones over Bluetooth, in the data transmission system as shown in FIG. 5. The Bluetooth headphone, whose adjacent target device is a Bluetooth headphone in the second transmission direction, is used as the target Bluetooth headphone, referring to FIG. 6, the data transmission method may include:

Block B310: the target Bluetooth headphone acquires sound signals and converts them into first audio data.

Block B320: the target Bluetooth headphone receives second audio data transmitted from one of the plurality of Bluetooth headphones which is adjacent to the target Bluetooth headphone in a first transmission direction.

Block B330: after the target Bluetooth headphone mixes the first audio data and the second audio data that are simultaneously received, the mixed audio data is transmitted to an adjacent target device in the second transmission direction.

Block B340: the target Bluetooth headphone receives third audio data transmitted from the mobile terminal via a Bluetooth connection between the mobile terminal and itself.

When the mobile terminal needs to transmit audio data to each Bluetooth headphone, the audio data is directly transmitted to each Bluetooth headphone through respective Bluetooth connections. For example, in FIG. 5, the mobile terminal directly sends audio data to one or more of the Bluetooth headphone a to the Bluetooth headphone e, that is, the mobile terminal can send audio data to the Bluetooth headphone a, and can also send audio data to other Bluetooth headphones except the Bluetooth headphone a.

In one embodiment, the mobile terminal transmits audio data to all Bluetooth headphones. All Bluetooth headphones receive audio data transmitted from the mobile terminal through respective Bluetooth connections with the mobile terminal, the audio data is used as the third audio data and is played.

In one embodiment, the audio data carries the identity of the Bluetooth headphone, and the mobile terminal transmits audio data to all Bluetooth headphones. All Bluetooth headphones receive audio data transmitted from the mobile terminal through respective Bluetooth connections with the mobile terminal, and the audio data is used as the third audio data. Each Bluetooth headphone determines whether the identity in the audio data is the same as its own identity. If yes, the third audio data is played; if not, the third audio data is discarded.

In one embodiment, the audio data carries the identity of the Bluetooth headphone, and the mobile terminal transmits the audio data to the Bluetooth headphone corresponding to the identity. If the audio data carries just one identity, the audio data is sent to one of the Bluetooth headphones corresponding to the identity. If the audio data carries several identities, the audio data is transmitted to some of the Bluetooth headphones respectively corresponding to the identities. The Bluetooth headphone receives the audio data transmitted from the mobile terminal through a Bluetooth connection therewith, the audio data is used as the third audio data and is played. When the mobile terminal is connected with the Bluetooth headphone, they can exchange identity information with each other, so that the mobile terminal can acquire the identity of each Bluetooth headphone.

In the embodiment of the disclosure, when the mobile terminal transmits audio data to the Bluetooth headphones, it can be directly transmitted through respective Bluetooth connections with the Bluetooth headphones. Of course, every Bluetooth headphone can also send audio data to the mobile terminal according to the Bluetooth connection thereof. In order to reduce the pressure of the mobile terminal receiving and processing the data, every Bluetooth headphone can transmit the audio data to an adjacent headphone in the second transmission direction.

The embodiment of the disclosure further provides a data transmission system, as shown in FIG. 1. The data transmission system includes a mobile terminal and a plurality of Bluetooth headphones. The mobile terminal and the plurality of Bluetooth headphones are connected in sequence over Bluetooth, and in a first transmission direction, there are more than one of the plurality of the Bluetooth headphones connected with the mobile terminal in sequence.

Wherein any one of the Bluetooth headphones is configured to acquire sound signals and convert them into first audio data, receive second audio data transmitted from an adjacent Bluetooth headphone in the first transmission direction, and transmit mixed first audio data and second audio data to an adjacent target device in a second transmission direction, after mixing the first audio data and the second audio data. The target device is a Bluetooth headphone or a mobile terminal, and the second transmission direction is opposite to the first transmission direction. The mobile terminal is configured to receive audio data from an adjacent Bluetooth headphone.

Specifically, in the data transmission system, a first Bluetooth headphone is configured to acquire sound signals and convert them into audio data, and transmit the audio data to an adjacent device in the second transmission direction. The first Bluetooth headphone can be any one of the plurality of Bluetooth headphones. If the adjacent device is the mobile terminal, the audio data in the data transmission system is transmitted to the mobile terminal in the second transmission direction.

If the adjacent device is one of the Bluetooth headphones, this Bluetooth headphone is used as a second Bluetooth headphone. The second Bluetooth headphone receives the audio data transmitted from the first Bluetooth headphone as the second audio data. If the second Bluetooth headphone simultaneously acquires sound signals and converts the sound signals to be audio data, the audio data is used as the first audio data. The second Bluetooth headphone mixes the first audio data with the second audio data, and transmits the mixed data to the adjacent device in the second transmission direction. If the second Bluetooth headphone fails to receive sound signals, the second audio data is transmitted to the adjacent device in the second transmission direction. If the adjacent device is the mobile terminal, the audio data in the data transmission system is transmitted to the mobile terminal in the second transmission direction.

If the adjacent device is one of the Bluetooth headphones, this Bluetooth headphone is used as a third Bluetooth headphone. The third Bluetooth headphone performs the same data transmission manner as that of the second Bluetooth headphone, and transmits the audio data in the second transmission direction until the audio data is transmitted to the mobile terminal.

In the data transmission system, the mobile terminal is further configured to transmit the third audio data to an adjacent Bluetooth headphone. Any one of the Bluetooth headphones is configured to receive and play the third audio data transmitted from an adjacent target device in the second transmission direction. If the target Bluetooth headphone has an adjacent Bluetooth headphone in the first transmission direction, the third audio data is transmitted to the adjacent Bluetooth headphone. Taking the data transmission system shown in FIG. 1 as an example, the Bluetooth headphone a receives and plays the third audio data sent from the mobile terminal, and transmits the third audio data to the Bluetooth headphone b. The Bluetooth headphone b receives and plays the third audio data sent from the Bluetooth headphone a, and transmits the third audio data to the Bluetooth headphone c, until the third audio data being sent to the Bluetooth headphone e.

In the embodiment of the disclosure, the data transmission system may further include another mobile terminal, and the mobile terminal is connected to the another mobile terminal via network, such as Wi-Fi, mobile data network, or the like. The another mobile terminal can also be sequentially connected with the plurality of Bluetooth headphones, to form a data transmission system as described in FIG. 1.

The mobile terminal can also be configured to receive audio data from the another mobile terminal as the third audio data. The mobile terminal transmits the third audio data to the Bluetooth headphones.

In addition, the mobile terminal can also be configured to send audio data received from an adjacent Bluetooth headphone to the another mobile terminal, so that the voice inputted by the user through the Bluetooth headphone can be transmitted to the another mobile terminal.

The data transmission method and the data transmission system provided by the embodiments of the disclosure can be used in a multi-person conference, and each Bluetooth headphone is worn by each conference user. Each user speaks through a pickup of the Bluetooth headphone, and hears the speech of others through the playback of the Bluetooth headphone. Therefore, in the multi-person conference, the mobile terminal receives the user's speech transmitted from the Bluetooth headphones, and can send it to another mobile terminal through the network, thereby enabling the user corresponding to the another mobile terminal to get the speech. The mobile terminal may also receive a user's speech corresponding to the another mobile terminal sent therefrom, and then transmit the speech to each Bluetooth headphone, so the speech is heard by each user. In the embodiment of the disclosure, the Bluetooth headphones connected with the mobile terminal can be divided into a number of groups, and each group is set to be worn by one user. Each group may include one Bluetooth headphone, or two Bluetooth headphones. If one Bluetooth constitutes one group, different Bluetooth headphones are used for different users; if two Bluetooth headphones constitute one group, two Bluetooth headphones of each group are worn by the same user. Since each group of Bluetooth headphones is set to be worn by one user, the Bluetooth headphones in each group are uniformly controlled. For convenience of description, in the embodiment of the disclosure, each group of Bluetooth headphones is described as one Bluetooth headphone. That is, one Bluetooth headphone described in the embodiment of the disclosure may be referred to two or more Bluetooth headphones that are controlled as a group.

Figure 7:
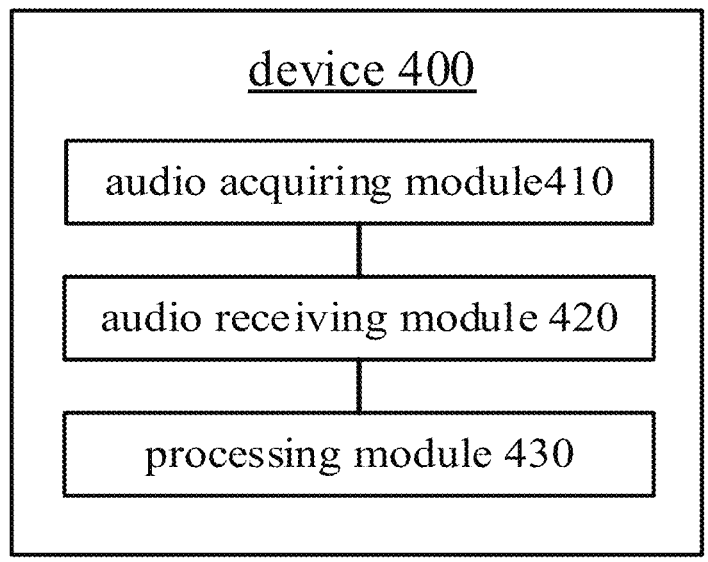
FIG. 7 illustrates a functional block diagram of a data transmission device provided by an embodiment of the disclosure.

The embodiment of the disclosure further provides a data transmission device 400, which is applied to a target Bluetooth headphone, and the target Bluetooth headphone is applied to a data transmission system. Referring to FIG. 7, the data transmission device 400 includes:

an audio acquiring module 410, configured to acquire sound signals and convert them into first audio data; an audio receiving module 420, configured to receive second audio data transmitted from an adjacent Bluetooth headphone in a first transmission direction; and a processing module 430, configured to mix the first audio data and the second audio data that are simultaneously received, and then transmit the mixed audio data to a target device in a second transmission direction, wherein the target device is a Bluetooth headphone or a mobile terminal, and the second transmission direction is opposite to the first transmission direction.

In some embodiments, the processing module 430 may superimpose the sampled values of the first audio data and the second audio data that are received at the same time to obtain the mixed audio data.

In some embodiments, the apparatus 400 may further include: another audio receiving module, which is configured to receive third audio data sent from an adjacent target device in the second transmission direction; a playing module, configured to play the third audio data; and an audio transmitting module, configured to transmit the third audio data to an adjacent Bluetooth headphone in the first transmission direction if the target Bluetooth headphone has the adjacent Bluetooth headphone in the first transmission direction.

In some embodiments, the another audio receiving module is further configured to receive the third audio data sent by the mobile terminal via a Bluetooth connection with the mobile terminal.

In some embodiments, the device 400 may further include a first judging module and a second judging module. The first judging module is configured to judge whether the third audio data carries an identity or not. If there is the identity carried, the second judging module is configured to judging whether the carried identity is the same as the identity of itself.

If yes, the playing module is configured to play the third audio data; the audio transmitting module is configured to transmit the third audio data to an adjacent Bluetooth headphone in the first transmission direction, if there is the adjacent Bluetooth headphone in the first transmission direction.

If not, the audio transmitting module is configured to transmit the third audio data to an adjacent Bluetooth headphone in the first transmission direction, if there is the adjacent Bluetooth headphone in the first transmission direction.

It will be apparent to those skilled in the art that the above embodiments may be referred to each other for convenience and concise of the description. For example, the same or similar parts between the method embodiments can be referred to each other. The specific working process of the foregoing description of the device and the system, can be referred to the corresponding process in the foregoing method embodiments, and details are not described herein again. For the foregoing method embodiments, there are corresponding modules or units for executing, and are not described here one by one.

In the embodiments provided of the disclosure, the coupling of the modules to one another may be electrical, mechanical or other forms.

In addition, functional modules in each embodiment of the disclosure may be integrated into one processing module, or functional modules may exist physically separately, or two or more modules may be integrated into one module. The above integrated modules can be implemented in the form of hardware or in the form of software.

Figure 8:
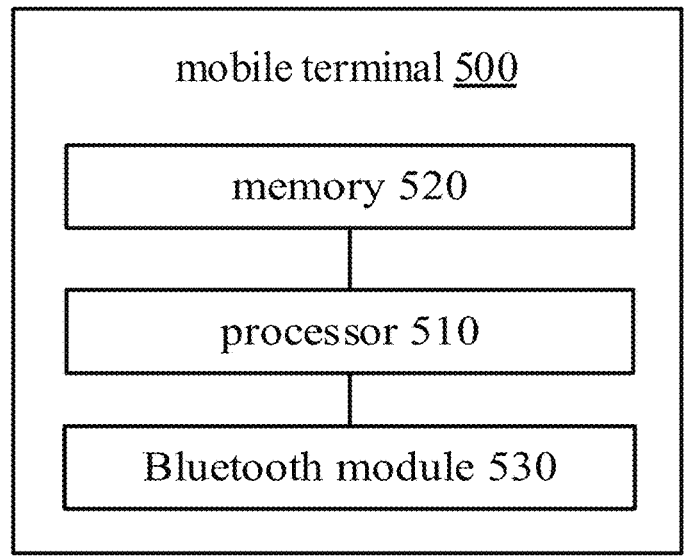
FIG. 8 illustrates a structural block diagram of a mobile terminal provided by an embodiment of the disclosure.

Another embodiment of the disclosure further provides a mobile terminal 500, which may be a mobile terminal capable of running applications, such as a smart phone, a tablet computer, or a computer. Referring to FIG. 8, the mobile terminal 500 includes one or more processor(s) 510 (just shown one), a memory 520, a Bluetooth module 530, and one or more program(s). Wherein the one or more program(s) is(are) stored in the memory 520 and configured to be executed by the one or more processor(s) 510, the one or more program(s) is(are) configured to perform that are required to be executed by the mobile terminal in one or more embodiment(s) described above.

The processor 510 can include one or more processing core(s). The processor 510 connects every portion of the entire mobile terminal 500 via various interfaces and lines, and performs various functions and processes data of the mobile terminal 500, by executing instructions, programs, sets of codes, or sets of instructions stored in the memory 520 and invoking data stored in the memory 520. In some embodiments, the processor 510 may adopt at least one hardware form of a digital signal processing (DSP), a field-programmable gate array (FPGA), and a programmable logic array (PLA). The processor 510 can integrate one or more of a central processing unit (CPU), a graphics processing unit (GPU), a modem, and the like. The CPU mainly deals with the operating system, user interfaces and applications, etc.; the GPU is responsible for rendering of the display content; the modem is used to process wireless communication. It can be understood that the above modem may also not be integrated into the processor 510 and is implemented by a single communication chip.

The memory 520 may include a Random Access Memory (RAM), and may include a Read-only Memory. The memory 520 can be used to store instructions, programs, codes, sets of codes, or sets of instructions. The memory 520 may include a storage program area and a storage data area, wherein the storage program area may store instructions for implementing the operating system, instructions for implementing at least one function, instructions for implementing the method of the above described embodiments, and the like. The storage data area can store data (such as a phone book, audio and video data, chat recording data) created by the mobile terminal 500 during use.

The Bluetooth module 530 may refer to a chip integrated with Bluetooth function for wireless network communication. The Bluetooth module 530 is electrically connected to the processor 510, and the mobile terminal 500 can connect to the Bluetooth headphones through the Bluetooth module 530. The mobile terminal 500 may include one or more the Bluetooth module(s) 530. If the mobile terminal 500 includes more than one Bluetooth modules 530, different Bluetooth modules 530 are connected with different Bluetooth headphones.

Figure 9:
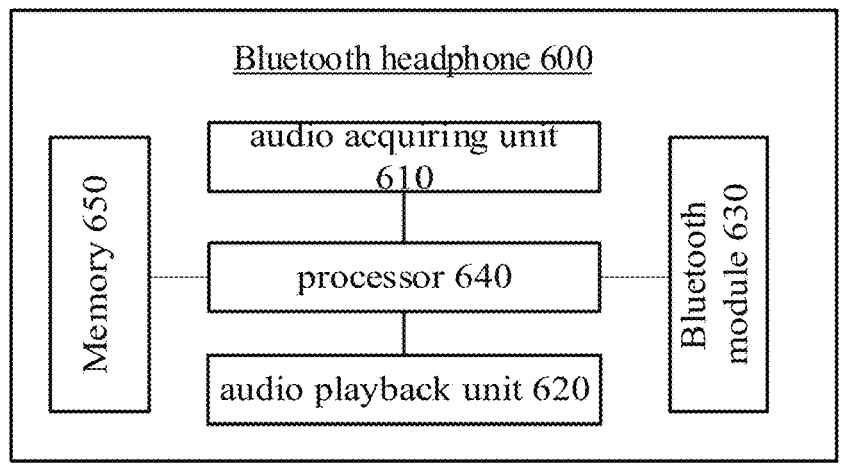
FIG. 9 illustrates a structural block diagram of a Bluetooth headphone provided by an embodiment of the disclosure.

As shown in FIG. 9, the embodiment of the disclosure further provides a Bluetooth headphone 600. The Bluetooth headphone can include an audio acquiring unit 610, an audio playback unit 620, a Bluetooth module 630, a processor 640, and a memory 650. The audio acquiring unit 610, the audio playback unit 620, the Bluetooth module 630, and the memory 650 are connected to the processor 640, respectively.

The Bluetooth module 630 is configured for performing Bluetooth connections between the Bluetooth headphone and the mobile terminal or other Bluetooth headphones. The Bluetooth headphone 600 may include a plurality of the Bluetooth modules 630 (just shown one), and different Bluetooth modules 630 are used to connect different devices.

The audio acquiring unit 610 is configured to acquire sound signals and send them to the processor 640.

The audio playback unit 620 is configured to play audio data sent from the mobile terminal.

The processor 640 is configured to perform processing operations of sampling, encoding, filtering, and the like on the sound signals to obtain audio data.

The Bluetooth headphone 600 also includes one or more program(s), wherein the one or more program(s) is(are) stored in the memory 650 and configured to be executed by the processor 640, the one or more program(s) is(are) configured to perform the above method described in the embodiment.

Figure 10:
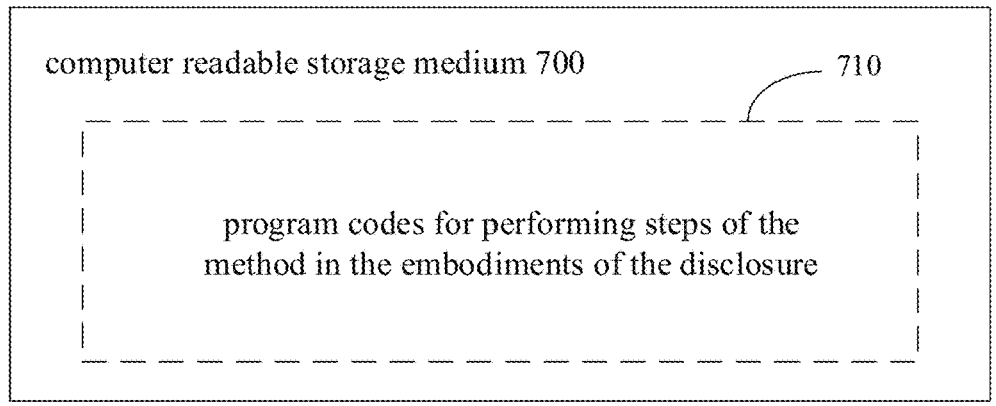
FIG. 10 illustrates a storage unit configured for storing or carrying program codes for implementing a data transmission method according to an embodiment of the disclosure.

Please refer to FIG. 10, which is a structural block diagram of a computer readable storage medium provided by an embodiment of the disclosure. Program codes are stored in the computer readable storage medium 700, and the program codes can be invoked by the processor to perform the methods described in the above method embodiments.

The computer readable storage medium 700 can be an electronic memory such as a flash memory, an Electrically Erasable Programmable Read Only Memory (EEPROM), an EPROM, a hard disk, a ROM, or the like. In some embodiments, the computer readable storage medium 700 includes a non-transitory computer-readable storage medium. The computer readable storage medium 700 has a storage space for executing program codes 710 which configured to perform any of the method blocks described above. The program codes can be read from or written to one or more computer program products. The program codes 710 can be compressed, for example, in a suitable form.

Finally, it should be noted that the above embodiments are only used to explain the technical solutions of the present disclosure, and are not limited thereto; although the present disclosure is described in detail with reference to the foregoing embodiments, those skilled in the art understand that the technical solutions described in the foregoing embodiments may be modified, or some of the technical features may be equivalently replaced; and the modifications and substitutions do not drive the essence of the corresponding technical solutions from the spirit and scope of the technical solutions of the embodiments of the present disclosure.

What is claimed is:

1. A data transmission method, applied to a target Bluetooth headphone of a data transmission system, wherein the data transmission system comprises a mobile terminal and a plurality of Bluetooth headphones, the mobile terminal and the plurality of Bluetooth headphones are connected in sequence over Bluetooth, and the target Bluetooth headphone is one of the plurality of the Bluetooth headphones, the method comprising:

acquiring sound signals and converting the sound signals into first audio data, through the target Bluetooth headphone;

determining, by judging a first number and a second number which is greater, whether another Bluetooth headphone transmitting audio data to the target Bluetooth headphone is in a first transmission direction of the target Bluetooth headphone or in a second transmission direction of the target Bluetooth headphone, wherein the second transmission direction is opposite to the first transmission direction, there are more than one of the plurality of the Bluetooth headphones connected with the mobile terminal in the first transmission direction, the first number is the number of Bluetooth headphones between the another Bluetooth headphone and the mobile terminal, the second number is the number of Bluetooth headphones between the target Bluetooth headphone and the mobile terminal;

when the first number is greater than the second number, determining the another Bluetooth headphone is in the first transmission direction of the target Bluetooth headphone, receiving audio data transmitted from one of the plurality of Bluetooth headphones which is adjacent to the target Bluetooth headphone in the first transmission direction of the target Bluetooth headphone, and defining the received audio data as second audio data;

after mixing the first audio data and the second audio data that are simultaneously received by the target Bluetooth headphone, transmitting the mixed audio data to an adjacent target device in the second transmission direction, wherein the target device is one of the plurality of Bluetooth headphones or the mobile terminal;

when the second number is greater than the first number, determining the another Bluetooth headphone is in the second transmission direction of the target Bluetooth headphone, receiving audio data transmitted from the adjacent target device in the second transmission direction of the target Bluetooth headphone, defining the received audio data as third audio data, and playing the third audio data.

2. The method according to claim 1, wherein mixing the first audio data and the second audio data that are simultaneously received by the target Bluetooth headphone comprises:

superimposing sampled values with the same sampling time in the first audio data and the second audio data that are simultaneously received to obtain the mixed audio data.

3. The method according to claim 1, after playing the third audio data, the method further comprising:

transmitting the third audio data to the Bluetooth headphone one of the plurality of Bluetooth headphones which is adjacent to the target Bluetooth headphone in the first transmission direction.

4. The method according to claim 1, prior to playing the third audio data, the method further comprising:

determining, by the target Bluetooth headphone, whether the third audio data includes an identity;

if yes, determining whether the included identity is the same as its own identity;

if the same, playing the third audio data;

if not the same, transmitting the third audio data to one of the plurality of Bluetooth headphones which is adjacent to the target Bluetooth headphone in the first transmission direction.

5. The method according to claim 4, further comprising:

if the third audio data includes no identity, playing the third audio data through the target Bluetooth headphone, and transmitting the third audio data to one of the plurality of Bluetooth headphones which is adjacent to the target Bluetooth headphone in the first transmission direction.

6. The method according to claim 4, wherein the identity is stored in a particular field of the third audio data.

7. The method according to claim 1, further comprising:

if the first audio data and the second audio data are not simultaneously received by the target Bluetooth headphone, transmitting the first audio data and the second audio data to the adjacent target device in the second transmission direction respectively.

8. The method according to claim 7, wherein the first received one of the first audio data and the second audio data is transmitted to the adjacent target device in the second transmission direction firstly.

9. The method according to claim 1, wherein mixing the first audio data and the second audio data that are simultaneously received by the target Bluetooth headphone comprises:

decoding the first audio data and the second audio data into data with a first audio format;

mixing the decoded first audio data and the decoded second audio data to obtain the mixed audio data with the first audio format; and encoding the mixed audio data into data with a second audio format, wherein the second audio format is different from the first audio format.

10. The method according to claim 9, wherein the first audio format is PCM, and the second audio format is AAC or SBC.

11. A target Bluetooth headphone, comprising:

one or more Bluetooth module(s), configured to connected with a mobile terminal and another Bluetooth headphone over Bluetooth;

a microphone, configured to acquire sound signals;

a speaker, configured to play corresponding audio data;
a processor;
a memory; and
one or more program(s), wherein the one or more program(s) is(are) stored in the memory and configured to be executed by the processor, the one or more program(s) is(are) configured to perform a data transmission method, wherein the method comprises:
acquiring sound signals and converting the sound signals into first audio data;
determining whether the another Bluetooth headphone transmitting audio data to the target Bluetooth headphone is in a first transmission direction of the target Bluetooth headphone or in a second transmission direction of the target Bluetooth headphone, by judging a first number and a second number which is greater; wherein the second transmission direction is opposite to the first transmission direction, the first number is the number of Bluetooth headphones between the another Bluetooth headphone and the mobile terminal, and the second number is the number of Bluetooth headphones between the target Bluetooth headphone and the mobile terminal;
when the first number is greater than the second number, determining the another Bluetooth headphone is in the first transmission direction of the target Bluetooth headphone, receiving audio data transmitted from the another Bluetooth headphone, defining the received audio data as second audio data, mixing the first audio data and the second audio data that are simultaneously received by the target Bluetooth headphone, and transmitting the mixed audio data to the mobile terminal;
when the second number is greater than the first number, determining the another Bluetooth headphone is in the second transmission direction of the target Bluetooth headphone, receiving audio data transmitted from the another Bluetooth headphone, defining the received audio data as third audio data, and playing the third audio data.

12. A data transmission system, comprising a mobile terminal and a plurality of Bluetooth headphones, wherein the mobile terminal and the plurality of Bluetooth headphones are connected in sequence over Bluetooth;
wherein the mobile terminal is configured to receive audio data from one of the plurality of the Bluetooth headphones which is adjacent to the mobile terminal;
wherein a target Bluetooth headphone of the plurality of the Bluetooth headphones is configured to:
acquire sound signals and convert the sound signals into first audio data,
determine whether another Bluetooth headphone transmitting audio data to the target Bluetooth headphone is in a first transmission direction or in a second transmission direction, by judging a first number and a second number which is greater; wherein the second transmission direction is opposite to the first transmission direction, there are more than one of the plurality of the Bluetooth headphones connected with the mobile terminal in the first transmission direction, the first number is the number of Bluetooth headphones between the another Bluetooth headphone and the mobile terminal, the second number is the number of Bluetooth headphones between the target Bluetooth headphone and the mobile terminal;
when the first number is greater than the second number, determine the another Bluetooth headphone is in the first transmission direction, receive audio data transmitted from the another Bluetooth headphone and define the received audio data as second audio data;
mix the first audio data and the second audio data that are simultaneously received, transmit the mixed audio data to an adjacent target device in the second transmission direction, wherein the adjacent target device is one of the plurality of Bluetooth headphones or the mobile terminal;
when the second number is greater than the first number, determine the another Bluetooth headphone is in the second transmission direction, receive audio data transmitted from the another Bluetooth headphone, define the received audio data as third audio data, and play the third audio data.

13. The data transmission system according to claim 12, wherein the mobile terminal is further configured to transmit the third audio data to one of the plurality of the Bluetooth headphones which is adjacent to the mobile terminal;
wherein the target Bluetooth headphone of the plurality of the Bluetooth headphones is further configured to: transmit the third audio data to an adjacent Bluetooth headphone in the first transmission direction.

14. The data transmission system according to claim 13, further comprising another mobile terminal, wherein the mobile terminal and the another mobile terminal are connected over network,
wherein the mobile terminal is further configured to receive the third audio data from the another mobile terminal,
wherein the mobile terminal is further configured to transmit audio data received from one of the plurality of Bluetooth headphones which is adjacent to the mobile terminal to the another mobile terminal.

15. The data transmission system according to claim 13, wherein the target Bluetooth headphone of the plurality of the Bluetooth headphones is further configured to determine whether the third audio data includes an identity;
if yes, the target Bluetooth headphone of the plurality of the Bluetooth headphones is further configured to determine whether the included identity is the same as its own identity;
if no, the target Bluetooth headphone of the plurality of the Bluetooth headphones plays the third audio data and transmit the third audio data to the adjacent Bluetooth headphone in the first transmission direction.

16. The data transmission system according to claim 15, wherein if the included identity is the same as its own identity, the target Bluetooth headphone of the plurality of the Bluetooth headphones plays the third audio data;
if not the same, the target Bluetooth headphone of the plurality of the Bluetooth headphones transmits the third audio data to the adjacent Bluetooth headphone adjacent to the target Bluetooth headphone in the first transmission direction.

17. The data transmission system according to claim 12, wherein the mobile terminal comprises a plurality of first Bluetooth modules, and the plurality of first Bluetooth modules are connected with the plurality of the Bluetooth headphones respectively.

18. The data transmission system according to claim 12, wherein any one of the plurality of the Bluetooth headphones comprises:
a Bluetooth module, configured to be connected with a mobile terminal or another Bluetooth headphone over Bluetooth;

a microphone, configured to acquire sound signals;
a speaker, configured to play corresponding audio data;
a processor; and
a memory with programs stored therein.

19. The data transmission system according to claim 12, wherein any one of the plurality of the Bluetooth headphones comprises more than one second Bluetooth modules, and the second Bluetooth modules are connected with different devices respectively.

20. The data transmission system according to claim 12, wherein the mobile terminal is connected with each of the plurality of Bluetooth headphones over Bluetooth.

\* \* \* \* \*